(12) United States Patent
May

(10) Patent No.: US 7,511,210 B2
(45) Date of Patent: Mar. 31, 2009

(54) DRUM RIM GAP OR SPACE DIMENSION GAUGE

(76) Inventor: Randall L. May, 2 Trafalgar, Newport Beach, CA (US) 92660-6830

( * ) Notice: Subject to any disclaimer, the term of this patent is extended or adjusted under 35 U.S.C. 154(b) by 0 days.

(21) Appl. No.: 12/006,725

(22) Filed: Jan. 7, 2008

(65) Prior Publication Data

US 2008/0173156 A1      Jul. 24, 2008

Related U.S. Application Data

(60) Provisional application No. 60/885,436, filed on Jan. 18, 2007.

(51) Int. Cl.
*G01D 13/02* (2006.01)
*G01B 3/20* (2006.01)

(52) U.S. Cl. .............................. 84/413; 33/836; 33/810

(58) Field of Classification Search .................. 84/413; 33/836, 810
See application file for complete search history.

(56) References Cited

U.S. PATENT DOCUMENTS

| | | | | |
|---|---|---|---|---|
| 355,971 A * | 1/1887 | Boulanger | .................... | 84/419 |
| 794,658 A | 7/1905 | Boulanger | | |
| 1,153,785 A * | 9/1915 | Helin | ........................... | 33/810 |
| 1,516,631 A * | 11/1924 | D'Erville | ..................... | 33/810 |
| 1,663,217 A * | 3/1928 | Ryan | ............................ | 33/810 |
| 1,742,869 A * | 1/1930 | Mirfield | ....................... | 84/454 |
| 2,256,478 A * | 9/1941 | Hill | ........................ | 73/862.21 |
| 2,527,173 A | 10/1950 | Boat | | |
| 2,550,249 A | 4/1951 | Hull | | |
| 2,642,670 A * | 6/1953 | Dow | ............................ | 33/531 |
| 3,016,619 A * | 1/1962 | Mueller | ......................... | 33/836 |
| 3,163,075 A * | 12/1964 | Toperzer, Jr. | .................. | 84/419 |
| 3,163,076 A * | 12/1964 | White | ........................... | 84/419 |
| 3,742,609 A * | 7/1973 | Jeannet et al. | ................. | 33/810 |
| 3,747,463 A * | 7/1973 | Hinger | ......................... | 84/419 |

(Continued)

OTHER PUBLICATIONS

Drum Tuning Tools Reviewed, Jeffrey Lafferty, posted Jan. 7, 2008, viewed Dec. 10, 2008. Review of DrumDial and the Evans Torque Tuning Key.*

(Continued)

*Primary Examiner*—Jeffrey Donels
*Assistant Examiner*—Robert W Horn
(74) *Attorney, Agent, or Firm*—Kirk A. Buhler; Buhler & Associates

(57) ABSTRACT

A drum gauge is disclosed that provides a measurement of the length of the tension rods. In operation the gauge is compressed, placed around each tension rod and released. A display on the gauge provides a numerical value for the relative exposed length of the tension rod(s). The gauge is then moved to each tension rod to determine the length of each rod or the gap or space between the hoops or between the hoop and the lug casings. A nut on the end of each tension rod is adjusted until all the tension rods are adjusted to the same length. The gauge allows the head to be evenly adjusted so the same pitch exists in all locations on the drum head. The gauge has a lip to ensure it is placed consistently on each tension rod and further includes posts to allow the gauge to be used with drums made with different tension rods, counter hoops, claws and lug casings.

18 Claims, 4 Drawing Sheets

U.S. PATENT DOCUMENTS

| | | | |
|---|---|---|---|
| 4,056,998 A | 11/1977 | Pampton | |
| 4,075,763 A | 2/1978 | Yamaryo | |
| 4,218,952 A | 8/1980 | Arbiter | |
| 4,229,883 A * | 10/1980 | Kobashi | 33/784 |
| 4,287,806 A * | 9/1981 | Neary | 84/458 |
| 4,630,521 A | 12/1986 | Alletto | |
| 5,107,560 A * | 4/1992 | Hulsey | 7/163 |
| 5,427,009 A | 6/1995 | LaPlante | |
| 5,447,087 A | 9/1995 | Wawes et al. | |
| 5,487,320 A * | 1/1996 | De Mowbray | 84/413 |
| 5,491,907 A * | 2/1996 | Vidmar | 33/832 |
| 5,682,682 A | 11/1997 | Renfrew et al. | |
| 5,722,179 A * | 3/1998 | Zanier | 33/811 |
| 6,043,419 A | 3/2000 | Arbiter | |
| 6,044,573 A * | 4/2000 | Cockrill | 33/836 |
| 6,220,133 B1 * | 4/2001 | Gosselin | 83/13 |
| 6,242,680 B1 | 6/2001 | Benton, Jr. | |
| 6,263,585 B1 * | 7/2001 | Dickinson et al. | 33/836 |
| 6,492,583 B1 | 12/2002 | Wilkey | |
| 7,065,897 B2 * | 6/2006 | Luner et al. | 33/836 |
| 7,216,441 B2 * | 5/2007 | Batora | 33/836 |
| 2008/0173156 A1 * | 7/2008 | May | 84/413 |

OTHER PUBLICATIONS

DrumDial, About, Information, and Instructions for use, © 1982-2008, viewed Dec. 10, 2008 at www.drumdial.com and links information and How to Use.*

* cited by examiner

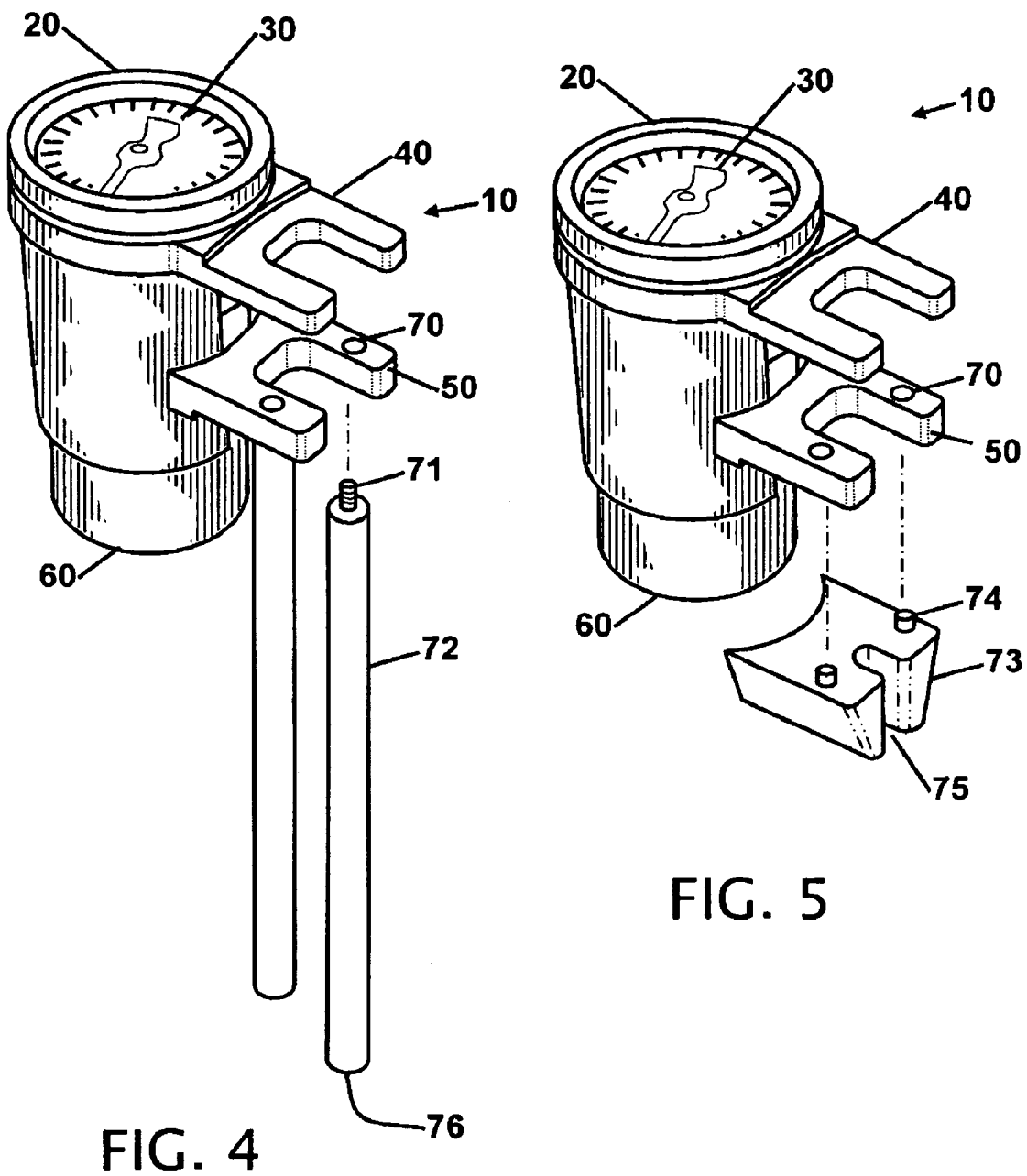

DRUM RIM GAP OR SPACE DIMENSION GAUGE

CROSS REFERENCE TO RELATED APPLICATION

This application claims the benefit of Provisional 60/885,436 filed Jan. 18, 2007 the entire contents of which is hereby expressly incorporated by reference herein.

DESCRIPTION

1. Field of the Invention

This invention relates to a drum rim adjustment gauge. More particularly, the present gauge is placed between the drum head hoop and the counter hoop and flange to indicate the length of the tension rods and or gap dimension.

2. Background of the Invention

All drums at one time or another require replacement of the drum head(s) or adjustment of the drum head. The adjustment is usually performed by loosening the tension rods and tightening the rods evenly in a pattern until the drum has the desired tone. Once the desired tone is achieved the drum head area near each tension rod is tapped and each tension rod is individually adjusted so the tone is the same. While this method is the typical method that is used it required a person with a trained ear to determine the correct setting and it often requires the steps to be repeated several times until the tension rods are evenly adjusted and the drum head is evenly tensioned. Other products have been disclosed to make adjustment of the tensions rods simpler. Some of these products are disclosed herein.

U.S. Pat. No. 5,427,009 issued Jun. 27, 1995 to Patrick R. LaPlante discloses a Hydraulic-drum tension/tuning system. The tuning system includes a hydraulic reservoir that is compressed and pulls the drum skin evenly over the shell of the drum. While this device solves the problem of evenly tensioning the tension rods, the tension rods, as disclosed in this patent, still include threaded portions and the length of the rods can still be altered. There is no measurement mechanism to determine the length of the tension rods to ensure that they are initially adjusted to the same lengths.

U.S. Pat. No. 4,218,952 issued Aug. 26, 1980 to Ivor D. Arbiter discloses drum tensioning where an angled rack and pinion is utilized to evenly pull the hoops down the side of the drum shell. While this patent also provides a method of evenly pulling the drum skin down the sides of the drum shell to ensure that the drum head is evenly tensioned, it does not provide for a measurement mechanism to determine the gap between the hoop and the shell.

U.S. Pat. No. 2,550,249 issued Apr. 24, 1951 to D. E. Hull discloses a Drum tuning device that includes a drum hoop with angled slots. The drum hoop is rotated on the drum shell and the drum head is pulled down the angled slots to increase the tension on the drum head. This patent also provides a method of evenly pulling the drum skin down the sides of the drum shell to ensure that the drum head is evenly tensioned, but it does not provide for a measurement mechanism to determine the gap between the hoop and the lug casing of the shell.

A drum tone adjusting device called DrumDial is found at www.drumdial.com discloses a drum head tension measurement device. The device is placed on the drum head in a position near a tension rod. On the bottom of the device a pin depresses the area under the device and the tension of the drum head is measured. While this device provides a display that shows the relative tension of the drum head in a particular location it does not indicate the dimensional measurement of the drum head to the counter hoops.

What is needed is a drum rim gap or space gap dimension gauge that is expandable between the hoops of a drum to indicate the length of the tension rods to ensure that each tension rod is set to an equivalent length to aide in tuning the drum head evenly to itself. The proposed drum gap or space gauge provides this solution with a novel and easy to use gauge.

BRIEF SUMMARY OF THE INVENTION

It is an object of the drum gap or space gauge to provide a gauge that is expandable between the hoops of a drum to indicate the length of the tension rods on a drum. The length of the tension rods provides information on the relative tone of a drum head. In an ideal setting the length of the tension rods would all be consistent, thus allowing the sound from the drum head to be in tune with itself.

It is an object of the drum gap or space gauge is to provide a gauge with arced lip that matches the radius of the drum being adjusted. In operation the lip is brought in contact with the hoops to ensure the gauge is placed at the same location on each tension rod. This allows for consistency of measurement and repeatability of subsequent readings.

It is another object of the drum gap or space gauge to provide a gauge that can straddle the tension rods. The ability of the gauge to straddle each tension rod ensures that the gauge is placed evenly on both sides of the tension rod to provide a flat measurement surface that is repeatable.

It is another object of the drum gap or space gauge to allow the gauge to include lug casings adapters of various configurations that allow for measurement between the lug casings and the hoops of a drum. Lug casing adapters can be installed and removed to match the shape and type of lug casings that are installed on each type of drum.

It is still another object of the drum gap or space gauge to allow the gauge to include gauge rods of various widths that allow for measurement across the hoops that retain the drum heads on opposing sides of a drum. Gauge rods can be installed and removed to match the shell dimensions of the drum being adjusted.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 4 shows the drum gap or space gauge with adapter rods.

FIG. 5 shows the drum gap or space gauge with a lug casing adapter for short tension rods.

DETAILED DESCRIPTION

Figure 1:
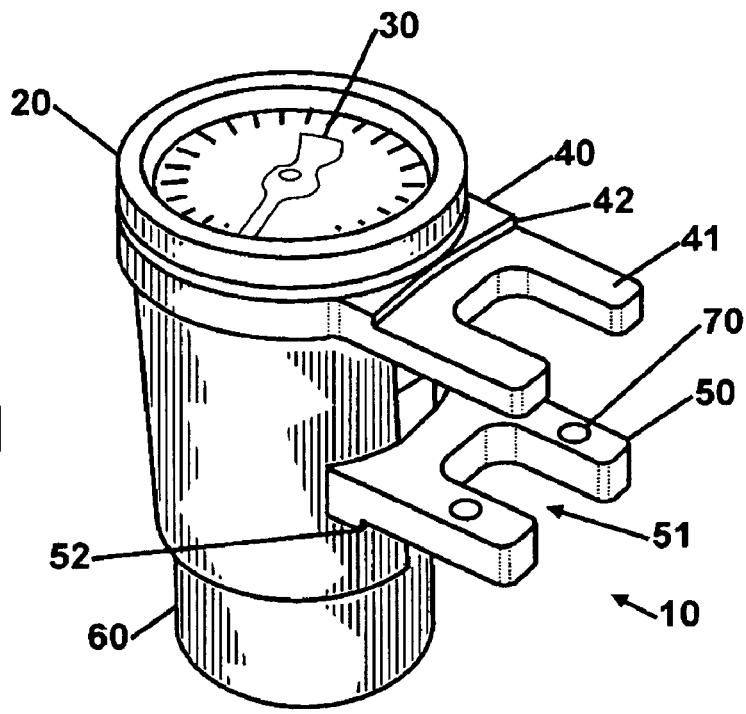
FIG. 1 shows an isometric view of the drum rim gap or space gauge.

FIG. 1 shows an isometric view of the drum rim gap or space gauge 10. In a general description of the gauge, the two sets of arms are squeezed together and the gauge is places between two surfaces for measurement. The gauge is released where it expands to measure the distance between the two areas. When the gauge is used to determine the drum head and the hoop distance on a drum, the actual numerical dimension is not as important, but the relative measurement all around the drum should be consistent to ensure the drum head is being evenly tensioned.

The gauge 10 has a dial with an indicating needle 30 to point to the markings on the faceplate. The indicating needle 30 is preferably covered with a sight glass or similar protective cover. The glass is held in position with a bezel 20. In one contemplated embodiment the bezel has one or more indicator markings and can be turned on the body of the gauge to indicate one or more preferred needle position(s). An upper appendage or arm 40 has two extensions configured in a "U" shape that allow for a clearance area 41 between the arms. The clearance area allows the gauge to straddle a bolt, rod or shaft. The ability to straddle the bolt, rod or shaft allows the gauge to measure the distance equally from both sides of the bolt, rod or shaft. A corresponding set of lower appendages or arms 50 also have a "U" shape and exist below the upper set of arms 40. These arms also have an open area 51 that exists between the arms for clearance of a bolt, rod or shaft. While a "U" shape is disclosed other shapes are contemplated including but not limited to "V", or simply plates that measure the area between the tension rod and the edge of the hoop.

Radiused lips 42 and 52 exist between the appendage or arm sets 40 and 50 respectively. The radiused lips correspond to the outer diameter of the drum hoops to ensure a proper fit with the drum. In operation the gauge is temporally inserted between the drum hoops until the lips make contact with the drum hoops to ensure the gauge is placed consistently in the same position around each rod. Holes 70 exist on the lower arms to allow for insertion of rods or lug casing adapters that allow the gauge to work with drums having various configurations of construction. Some of these alternately constructed drums are disclosed herein. The lower appendages or arms 50 are connected to the base tube 60 and guided into the upper portion of the gauge. The construction of the internal construction is disclosed with FIG. 2.

Figure 2:
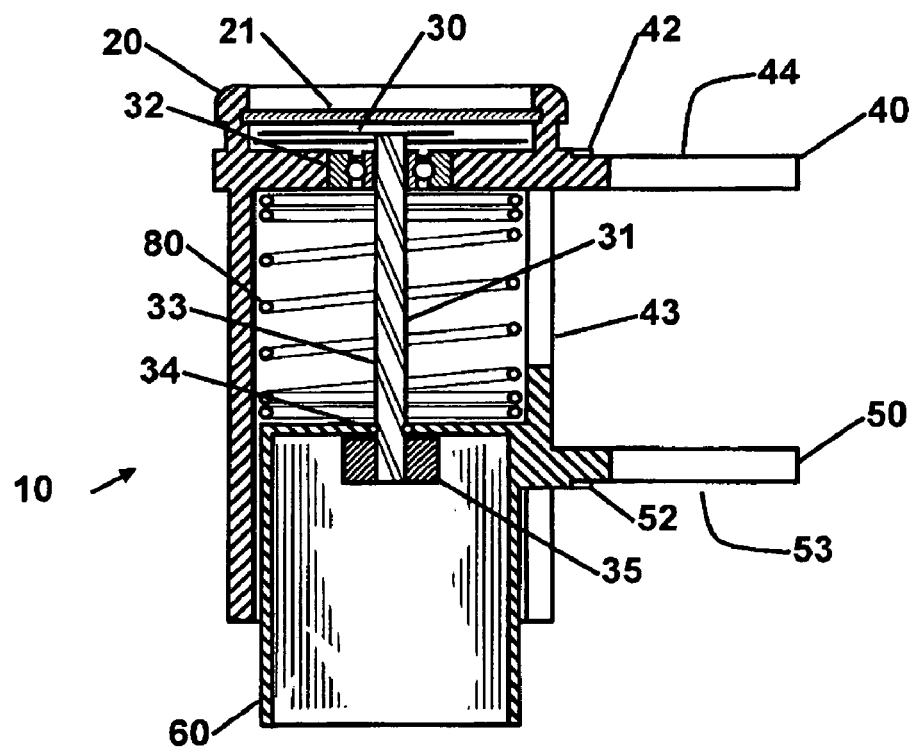
FIG. 2 shows a partial cross sectional view showing the internal structure of the drum gap or space gauge.

FIG. 2 shows a partial cross sectional view showing the internal structure of the drum gap or space gauge 10. Internally the gauge has a spring 80 that exerts force on the upper and lower portions of the gauge to maintain the appendages or arms 40 and 50 in an open or closed condition. In the preferred embodiment the spring 80 is a compression spring, but it is also contemplated that the spring 80 can be an extension spring and a user spreads the arms for the gauge to measure the gap from the outside of the tension hoops. The gauge is maintained from over expansion with a lower stop 35. The lower stop 35 is secured to a high pitch helical screw shaft 31. The pins or threaded insert 34 are engaged in the screw shaft and when the lower portion of the gauge is moved up or down the pins or threaded insert 34 follows in the groove 33 in the shaft 31, making the shaft turn. The bearing 32 keeps the shaft it a perpendicular orientation and the indicating needle 30 moves to show the movement. A faceplate with radial markings exists between the needle and the bearing to indicate the position of the needle. A sight glass 21 covers the needle. The glass is held in position with a bezel 20. In one contemplated embodiment the bezel has one or more indicator markings and can be turned on the body of the gauge to indicate one or more preferred needle position(s).

A vertical opening 43 in the upper portion of the top portion of the gauge to prevent the lower portion of the gauge from rotating as the upper and lower parts and moved within each other. The lower portion of the gauge 60 telescopes within the upper portion of the gauge. When the gauge is compressed and positioned on the outside of a drum the top 44 of the upper arm and the bottom 53 of the lower arm makes contact with the drum hoops and the distance is indicated by the needle 30. When the inserted gauge is correctly positioned the radiused lip 52 of the gauge is in contact with the outer radius of the drum hoop.

Figure 3:
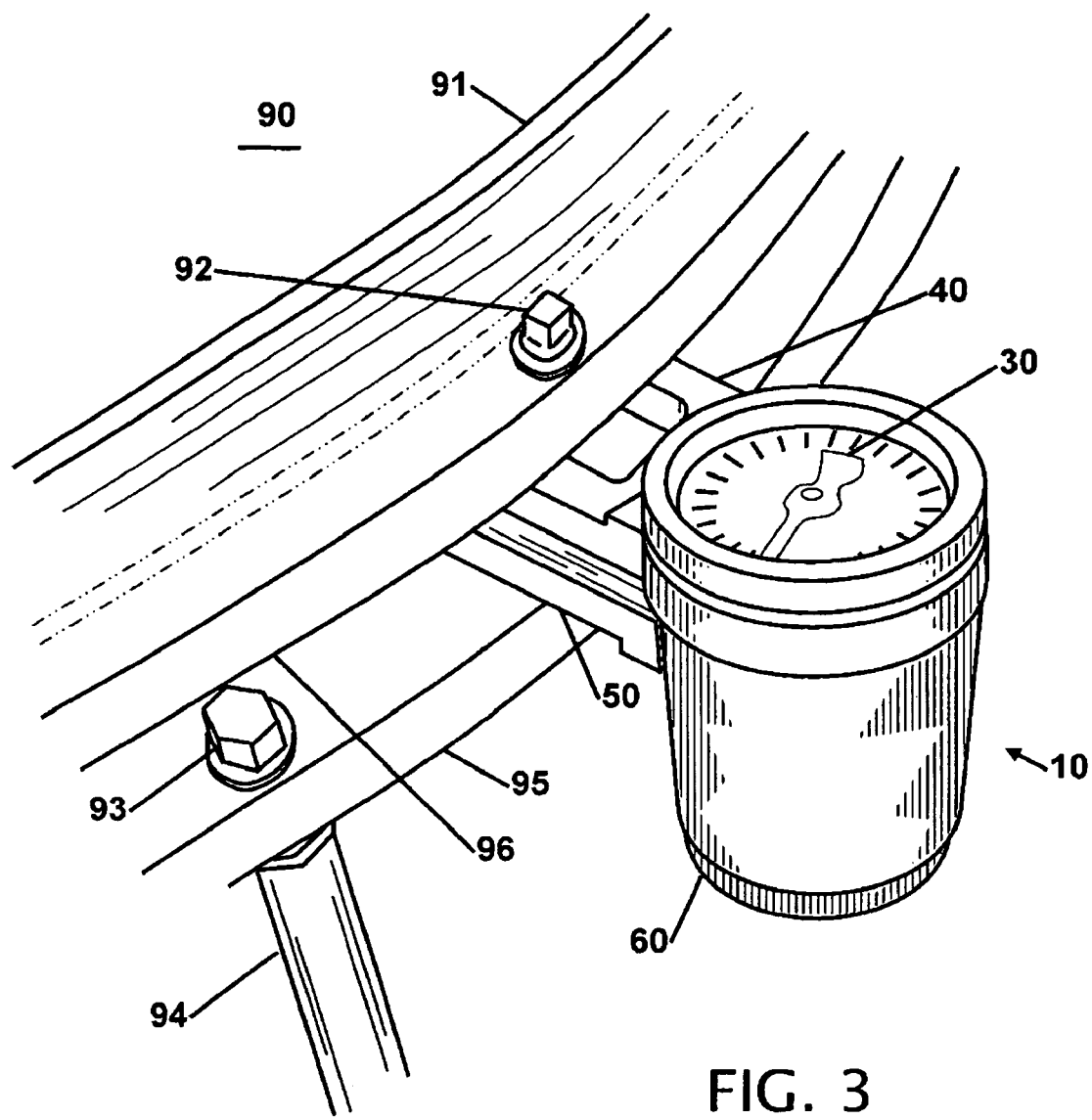
FIG. 3 shows the drum gap or space gauge being used on a high tension drum.

FIG. 3 shows the drum gap or space gauge 10 being used on a high tension drum 90. This configuration of drum has coupling tubes 94 and the nut or bolt 93 secures edge ring 95 to the connecting rod or tube 94 that sandwiches the drum shell between the securing drum head hoops. The adjustment of the tone of the drum is with tension rod(s) 92 that exist around the outer rim of the drum securing hoop 96 to edge ring 95. The drum head is pulled over the edges of the drum edge ring 95 and the rim 91 of the edge ring has a raised lip. When the drum is tuned and adjusted the goal is to adjust the drum such that the gap between the hoops is consistent all around the drum.

The needle 30 on the gauge indicates the relative expansion of the gauge to provide an indication of the gap between the hoops. The lower portion of the gauge 60 is significantly imbedded into the upper portion of the gauge because the gap between the upper arms 40 and the lower arms 50 is minimal. When the drum is being adjusted, tuning tension rod 92 is turned to alter the distance between the edge ring 95 and drum hoop 96.

Figure 6:
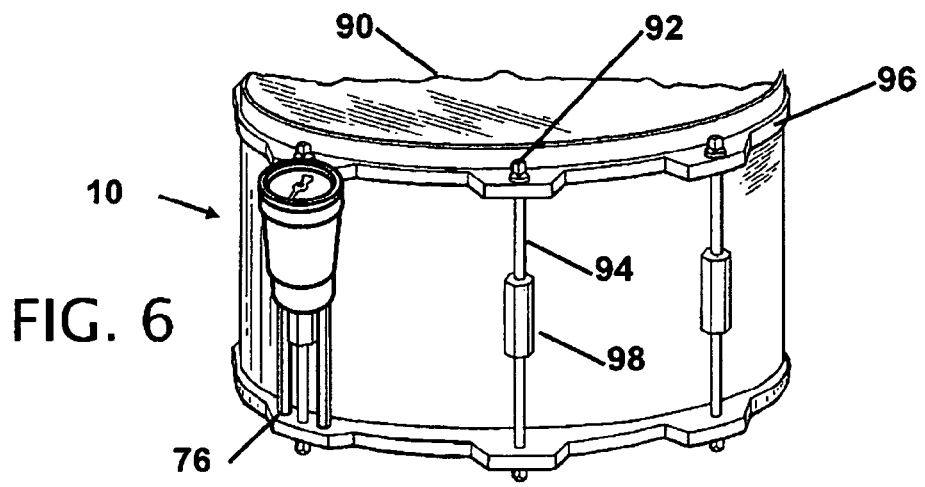
FIG. 6 shows the drum gap or space gauge being used with a drum having tension rods that attach to both drum heads.

FIG. 4 shows the drum gap or space gauge with adapter rods, and FIG. 5 shows the drum gap or space gauge with a lug casing adapter for short tension rods. In FIGS. 4 and 5 the same gauge 10 is shown. The gauge includes the upper bezel 20 with the indicator needle 30. The gauge has the same upper arms 40 and lower arms 50. The bottom of the gauge is movable to alter the position of the upper arms 40 to the lower arms 50. The lower housing 60 can be depressed or the arms can be squeezed together to compress the gauge. The hole(s) 70 are shown with adapter rods 72 inserted or screwed 71 into the hole(s) 70. In the preferred embodiment the rods 72 are threaded 71 into hole(s) 70, but other methods are contemplated including but not limited to a press fit or magnetic coupling. It is contemplated that the gauge includes pairs of rods with different lengths to allow the gauge to work with a variety of drum shell sizes. In operation the top of the upper arms are placed on one hoop and the bottom of the rods 76 is placed on another hoop to determine the relative distance between hoops. FIG. 6 shows the gauge being used in this configuration.

Figure 7:
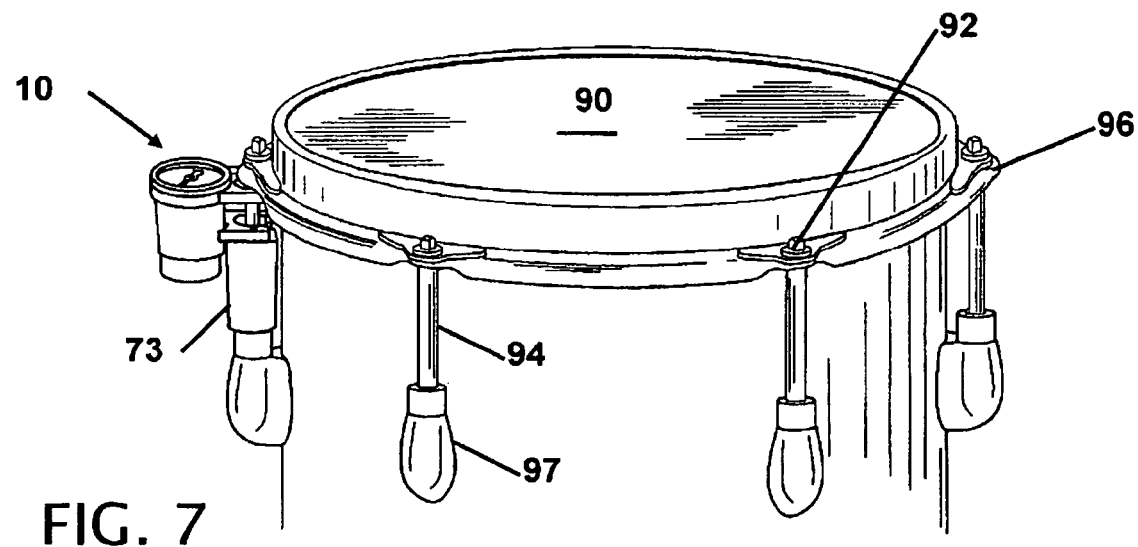
FIG. 7 shows the drum gap or space gauge being used with a drum having independent lug casings.

The lug casing adapter in FIG. 5 is installed into the holes 70 of the gauge where pins 74 are inserted into the holes 70. Multiple lug casing adapters 73 can be made with different overall lengths to accommodate tension rods of different lengths and lug casing configurations. In the configuration shown, a narrow groove 75 exists that corresponds to the diameter of the tension rod. The bottom of the lug casing adapter sits on the top of the lug casing, and the top of the upper arm sits on the inside of the upper hoop to indicate the distance between the hoop and the lug casing. FIG. 7 shows the gauge being used in this configuration with a lengthened adapter 73.

FIG. 6 shows the drum gap or space gauge 10 being used with a drum having tension rods that attach to both drum head hoops. The drum in this figure uses tension rods that extend between the drum head securing hoops 96 on both sides of the drum 90. The tension rods 94 are secured to each of the drum head securing hoops 96. Adjusting the drum head is made by turning the head of tension rod 94 (92), or the adjustment is made by turning turnbuckle 98 between the tension rods 94. The rods 72 that were shown and described with FIG. 4 are used with the gauge where the bottom of the rods 76 are engaged on one drum hoop and the top arms of the gauge are engaged on the other hoop. After noting the position of the needle from around one tension rod the gauge is moved to another rod and the needle position is noted. The turn buckle 98 is adjusted until the distance at all of the tension rods is the same.

FIG. 7 shows the drum gap or space gauge 10 being used with a drum having independent lug casings. In this embodiment the length of the tension rods 94 are adjusted with the bolts 92 that pull on the hoop 96 down to tune the drum 90. The gauge 10 is fitted with the lug casing adapter 73 that was described in FIG. 5. The lug casings 97 are secured through the drum shell and their position on the drum is consistent in all positions. In operation the gauge and the lug casing adapter is compressed and placed between the top of the lug casing and the hoop to indicate the relative position of the lug casing to the hoop. The nut(s) 92 are adjusted until the distance at all the tension rods 94 is the same.

Thus, specific embodiments of a drum gap or space gauge have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A drum hoop gap gauge comprising:
a spring loaded measurement device having a body;
a display mounted on one end of the body;
at least two arms extending perpendicular to the body wherein the spring expands a gap between the at least two arms;
the at least two arms configured for placement between drum tension hoops;
a gear engageably mounted to at least one of the at least two arm wherein as the gap between the at least two arms changes the gear turns to provide a measurement indication on the display that is related to the gap between the drum tension hoops.

2. The drum hoop gap gauge according to claim 1 wherein the body is an elongated shape having two portions that telescope inside each other and each portion has at least one of the two arms extending perpendicular from their respective portion.

3. The drum hoop gap gauge according to claim 1 wherein each of the two arms are configured in a "U" shape to engage onto the drum hoop around a drum tension rod.

4. The drum hoop gap gauge according to claim 1 wherein the display is analog or digital.

5. The drum hoop gap gauge according to claim 1 wherein the display can be zeroed and further has a plus and minus indicator from the zeroed position.

6. The drum hoop gap gauge according to claim 1 wherein the gear is a helical screw shaft that is attached to a display needle.

7. A drum hoop gap gauge comprising:
a compressible measurement device having parallel spaced engagement arms wherein the arms are configured for placement between drum tension hoop and or tension rod casing and or tension rod;
a mechanical link connected to at least one of the parallel spaced engagement arms;
a display means connected to the mechanical link that displays a relative or an absolute measurement between the parallel spaced engagement arms wherein each of the two arms are configured in a "U" shape to engage onto the drum hoop around a drum tension rod.

8. The drum hoop gap gauge according to claim 7 wherein the compressible measurement device has an internal compression spring that pushes apart the parallel spaced engagement arms.

9. The drum hoop gap gauge according to claim 7 wherein the display means is analog or digital.

10. The drum hoop gap gauge according to claim 7 wherein the display means can be zeroed and further has a plus and minus indicator from the zeroed position.

11. The drum hoop gap gauge according to claim 7 wherein the engagement arms further include engagement means for securing lug casing adapters that increase or decrease a measurement gap between the parallel spaced engagement arms.

12. The drum hoop gap gauge according to claim 8 wherein the mechanical link is by means of a helical screw shaft secured to an indicating needle and the movement of an engagement arm translates a guide pin to turn the helical screw shaft.

13. A drum hoop gap gauge comprising:
an expandable measuring device having at least two appendages configured for temporal placement between drum tension hoops or a drum hoop and or lug casing;
a mechanical connection with at least one of the appendages that provides a display of the distance between the drum tension hoops wherein the appendages further include engagement means for securing lug casing adapters that increase or decrease a measurement gap between the parallel spaced engagement arms.

14. The drum hoop gap gauge according to claim 13 wherein the two appendages are configured for placement on, around, between or near tension rods.

15. The drum hoop gap gauge according to claim 13 wherein the mechanical connection is with at least one of the appendages that turns a gear, screw or rack that results in a change in the display.

16. The drum hoop gap gauge according to claim 13 wherein the distance being displayed is an absolute measurement of the distance between the drum tension hoops and or the relative distance between sequential placements of the drum hoop gauge on the drum.

17. The drum hoop gap gauge according to claim 13 wherein the expandable measurement device is expands with a compression spring located within the expandable measuring device.

18. The drum hoop gap gauge according to claim 13 wherein the expandable measurement device is manually expandable by resisting the force of an extension spring.

* * * * *